Figure 1:
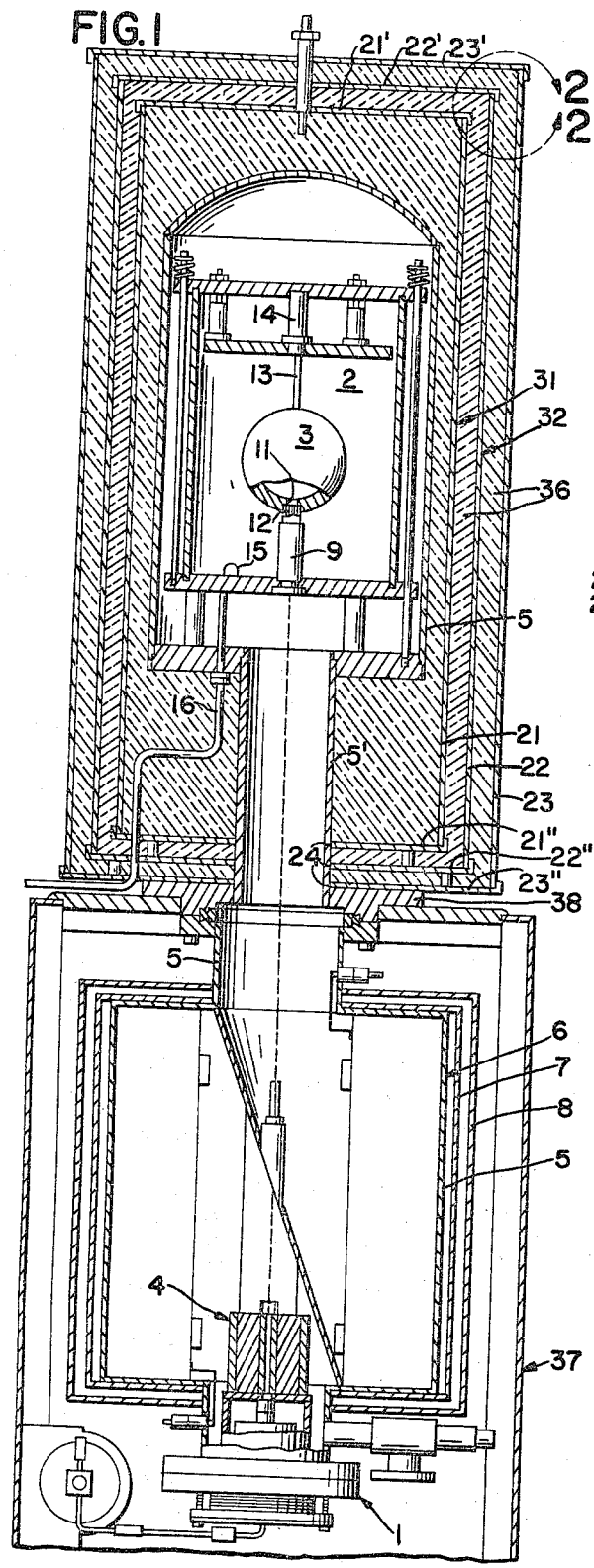

Oct. 3, 1967 R. F. C. VESSOT 3,345,581
ATOMIC RESONANCE METHOD AND APPARATUS WITH IMPROVED
MAGNETIC FIELD HOMOGENEITY CONTROL
Filed May 11, 1964 2 Sheets-Sheet 1

INVENTOR.
ROBERT F. C. VESSOT
BY
*Harris E. Aine*
ATTORNEY

Oct. 3, 1967    R. F. C. VESSOT    3,345,581
ATOMIC RESONANCE METHOD AND APPARATUS WITH IMPROVED
MAGNETIC FIELD HOMOGENEITY CONTROL
Filed May 11, 1964    2 Sheets-Sheet 2

FIG. 4

FIG. 5

INVENTOR.
ROBERT F.C. VESSOT
BY
Harry E. Aine
ATTORNEY

United States Patent Office 3,345,581
Patented Oct. 3, 1967

3,345,581
ATOMIC RESONANCE METHOD AND APPARATUS WITH IMPROVED MAGNETIC FIELD HOMOGENEITY CONTROL
Robert Frederick Charles Vessot, Marblehead, Mass., assignor, by mesne assignments, to Hewlett-Packard Company, Palo Alto, Calif., a corporation of California
Filed May 11, 1964, Ser. No. 366,493
8 Claims. (Cl. 331—94)

The present invention relates in general to atomic resonance method and apparatus and more particularly to such apparatus provided with improved magnetic field homogeneity control whereby atomic resonance within the apparatus is narrowed in line width and frequency pulling effects of magnetic field in homogeneities are reduced in magnitude. Such improved atomic resonance apparatus is especially useful, for example, as a frequency standard.

Heretofore atomic resonant apparatus has been constructed wherein an assemblage of atoms has been caused to undergo atomic resonance, atomic resonance being received and processed for frequency control or used as a frequency standard. Notable among such prior apparatus is the hydrogen maser as described in U.S. patent Application No. 142,356 titled, "Atomic Hydrogen Maser," inventor, Norman F. Ramsey et al., filed Oct. 2, 1961, now Patent No. 3,255,423, and assigned to the same assignee as the present invention.

A characteristic of such atomic resonant apparatus is that an assemblage of atomic particles such as gaseous hydrogen atoms is obtained in a region of space permeated by a uniform polarizing or aligning magnetic field. Within the aligning magnetic field the atomic particles are caused to undergo atomic resonance. The resonance is detected and used for frequency control or as a frequency standard. In the case of the hydrogen maser a hyperfine resonance of the atoms is used and the polarizing magnetic field has a magnitude preferably in the order of 100's of microgauss in order to reduce second order field shifts of the hyperfine transition or resonance frequency. In one preferred embodiment of the hydrogen maser the atomic particles are stored within the resonant R.F. magnetic fields of a cavity resonator for on the order of a second by means of a bounce box. The polarizing magnetic field should be quite uniform over the atom storage region or else maser oscillations of the atomic particles will be quenched rendering the apparatus inoperable.

Heretofore a plurality of nested closed cylindrical magnetic shields have surrounded the bounce box and cavity resonator for shielding out the unwanted earth's field of approximately ½ gauss. The polarizing field (from 100 to 1,000 microgauss) was produced by a solenoid wound inside and axially coextensive with the central region of the innermost magnetic shield. The shields were closed at their ends except for axially aligned beam entrance apertures at one end to permit a beam of hydrogen atoms to enter the bounce box and cavity resonator.

It has been found that the prior solenoid introduced certain gradients in the polarizing magnetic field in the bounce box region because the solenoid did not extend up to the end walls of the innermost magnetic shield and furthermore the beam entrance apertures in the magnetic shields introduced local inhomogeneities in the polarizing magnetic field which were "seen" by the resonant atomic particles thereby broadening the resonant line width and quenching desired maser oscillations when the inhomogeneities exceed certain magnitudes.

In the present invention novel magnetic field homogeneity control is provided which permits generation of separately adjustable local bucking magnetic fields for cancelling out the magnetic field inhomogeneities produced by the beam entrance aperture and end effects of the polarizing magnetic field solenoid. This improved field control has permitted reduction of the polarizing magnetic field intensity to low levels of magnitude as of 10's of microgauss while at the same time reducing the percentage of inhomogeneity to a low magnitude whereby frequency resettability and stability have been enhanced.

The principal object of the present invention is the provision of an atomic resonance apparatus having enhanced frequency stability especially usable, for example, as a frequency standard.

One feature of the present invention is the provision of an externally magnetically shielded polarizing magnetic field electromagnet wherein the end turns of the magnet extend, in axial extent, up to end closing magnetically permeable portions whereby undesired end effects of the magnet are minimized.

Another feature of the present invention is the provision of means for variably adjusting the ampere turns per unit length of certain portions of a magnetically shielded polarizing magnetic field solenoid relative to certain other portions whereby certain magnetic field inhomogeneities within the solenoid as due to the shields themselves may be cancelled.

Another feature of the present invention is the same as the preceding feature wherein the ampere turns per unit length of both end sections of the solenoid are adjustable relative to the central region of the solenoid whereby undesired end effects of the solenoid may be corrected to obtain enhanced magnetic field homogeneity within the solenoid.

Figure 2:
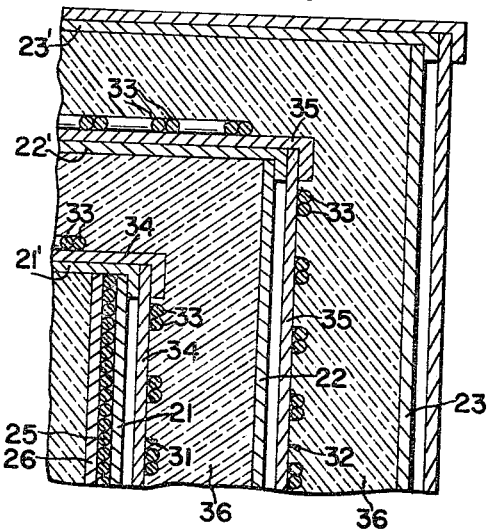
Figure 3:
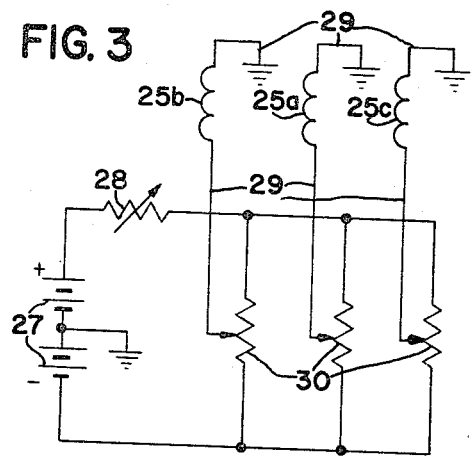

Other features and advantages of the present invention will become apparent upon a perusal of the following specification taken in connection with the accompanying drawings wherein:

FIG. 1. is a longitudinal sectional view of a hydrogen maser atomic resonant apparatus employing features of the present invention, FIG. 2 is an enlarged sectional view of a portion of the structure of FIG. 1 delineated by line 2—2, FIG. 3 is a schematic circuit diagram for the solenoid field control apparatus of the present invention, FIG. 4 is a schematic diagram of an atomic beam tube using an alternative magnetic field control embodiment of the present invention, and FIG. 5 is an enlarged sectional view partly schematic and partly in phantom of a portion of the structure of FIG. 4 delineated by line 5—5.

Referring now to FIG. 1, there is shown in partial cross-sectional view the hydrogen maser apparatus of the present invention. The apparatus includes a beam generating device 1 for forming and projecting a beam of atomic hydrogen generally longitudinally of the tube apparatus. A cavity resonator 2 is disposed at the terminal end of the beam path. The cavity resonator 2 contains therewithin a storage bulb 3 or bounce box as of quartz with a non-relaxing wall coating as of Teflon for storing the atomic hydrogen particles for on the order of one second duration before they exit from the bulb 3 through the entrance port. Within the bulb 3 the stored particles undergo a hyperfine transition at about 1420 megacycles giving off coherent spontaneous emission of radiation which is extremely stable in frequency.

A state selecting hexapole magnet 4 is disposed at the up stream end of the atomic beam path for focusing out of the beam the hydrogen atoms that are not in the desired upper hyperfine energy state. An elongated tubular vacuum envelope structure 5 surrounds the cavity and the beam path in between the source 1 and the cavity 2. A vacuum pump 6 surrounds the initial portion of the beam path and forms a combined envelope portion and vacuum pump 6. The pump 6 is of the getter ion type described in U.S. Patent No. 2,983,433 issued May 9, 1961.

A pair of magnetic shields 7 and 8 as of 1/16" sheet soft iron and 1/16" sheet Mumetal, respectively, surround the vacuum pump 6 for shielding the cavity 2 from stray magnetic fields produced by the permanent magnets of the pump 6.

The storage bulb 3 is supported within the cavity resonator 2 via the intermediary of a dielectric tube 9 with its axial bore in coaxial alignment with the hydrogen beam path for passage of the beam therethrough. The bulb 3 is provided with an aperture 11 in axial alignment with the tube 9. A multiple hole collimator 12 is disposed in a narrow neck portion of tube 9. Atomic hydrogen beam particles pass through the tube 9, collimator 12, aperture 11 and into the bulb 3.

Within the bulb the beam particles undergo many successive wall collisions as of more than 10,000 before they finally pass out of the bulb via aperture 11, collimator 12 and tube 9. A dielectric support rod 13 is fixedly secured to the bulb 3 and extends away from the bulb 3 in a way that is diametrically opposed to the support tube 9. The dielectric rod 13 is held at its free end in a spring loaded pocket 14 and together with tube 9 supports the dielectric storage bulb 3 within the cavity 2. A coupling loop 15 is formed in the end of a coaxial line 16 and passes into the cavity 2, is coupled to the field thereof, and serves to extract the output signal of the maser and passes same to a suitable utilization device, not shown.

A plurality of nested spaced apart cylindrical magnetic shields 21, 22 and 23 respectively (see FIG. 2) surround the cavity 2 and upper part of the vacuum envelope 5. The magnetic shields serve to shield the bounce box 3 from extraneously produced magnetic fields such as the earth's field. The shields are made of a highly magnetic permeably material such as Mumetal or Permalloy. In a typical example they have diameters of 19.5", 22.5" and 25" and lengths of 42.5", 45.0" and 47.5" respectively and shields 21, 22 and 23 are made of 0.025" thick Permalloy. The cylindrical shields include end closing covers 21', 22' and 23' made of 0.025" Permalloy. The lower covers 21", 22" and 23" are centrally apertured at 24 to permit passage of the narrow neck portion of the vacuum envelope at 5' which is approximately 5.5" in diameter.

A polarizing magnetic field solenoid 25 is wound inside the innermost magnetic shield 21 on a cylindrical coil form 26 as of 0.040" thick aluminum. The solenoid 25 consists of single layer of turns of copper wire as of, for example, 16 gauge Formvar insulated. In a preferred embodiment of the present invention the end turns of the solenoid 25 are disposed immediately adjacent the end closing magnetic cover 21' and 21" of the inner magnetic shield 21 in order to minimize undesired end effects (inhomogeneities in the magnetic field of the solenoid due to the finite length of the solenoid) of the solenoid. By extending the end turns up to the covers 21' and 21" the highly magnetically permeable end covers appear as magnetic mirrors (more fully described below). In this manner the continuous solenoid 25 with end reflective magnetic mirrors produces a magnetic field substantially free of end effects due to the finite length of the solenoid 25 and approximates to a relatively close degree the field produced by an infinitely long solenoid.

In a typical example of the solenoid 25 it contains 665 turns of wire and is operated with sufficient current drawn therethrough to produce a uniform axial polarizing magnetic field in the bounce box 3 of an intensity on the order of 10 microgauss.

The solenoid 25 is split into three separately energizable sections (see FIG. 3) including a central section 25a and a pair of end sections 25b and 25c. The central section 25a contains a preponderance of the turns of the solenoid as of 90% while each of the end sections contains as of 5% of the turns of the composite solenoid 25. Separate control over the ampere turns and direction of current flow of the end sections 25b and 25c is obtained via potentiometers 30 and leads 29 supplied with current from a centertapped battery 27 via variable resistor 28. Leads 29 are twisted together to prevent generation of undesired magnetic field gradients by the current supplied to the solenoid and the leads 29 are brought into the solenoid through small holes in the lower end covers of the shields and pass up and through the coil form 26.

The separate control over the solenoid sections permits compensation and correction for small residual end effects of the solenoid 25. In addition, the end sections permit correction for field perturbations occasioned by the presence of the aligned apertures 24 in the lower covers 21", 22" and 23". The relatively large apertures 24 permit strong external fields to enter the shields therethrough. The stray fields and localized field perturbations are cancellable by proper adjustment of the ampere turns of the end sections 25b and 25c relative to the main solenoid section 25a.

Proper adjustment of the relative ampere turns of the separate sections of the solenoid 25 is obtained in the following way: The maser is put into operation with only the main section 25a of the solenoid energized (for a polarizing field of approximately 50 milligauss) and sections 25b and 25c have their currents reduced to zero. With the maser in operation the end sections 25b and 25c are separately adjusted for maximum maser oscillation or resonance amplitude. Successive readjustment of the main section 25a and the lower end section 25c permits reduction of the polarizing magnetic field to less than 10 microgauss with very little gradient.

This fine control over the magnitude and homogeneity of the polarizing magnetic field permits substantial enhancement in stability of the maser and greatly reduces the magnitude of the correction to be made to the output frequency to bring it to a standardized value.

A plurality of ovens 31 and 32 surround, respectively, the two inner magnetic shields and cavity 2 for holding the cavity 2 at a constant temperature to render same insensitive to temperature fluctuations in the ambient environment. The innermost oven 31 comprises an insulated twisted bifilar heater wire 33 as of 30 gauge 0.1Ω/ft. resistance wire wound on the outside of a closed cylindrical can 34 as of 0.060" thick aluminum for evenly conducting the heat over the surface of the can 34 to provide an isothermal surface. A second similar isothermal can 35 surrounds the second magnetic shield 22. A thermal insulating material 36 as of Freon blown plastic foam fills the spaces between the isothermal cans 34 and 35 and their next respective surrounding magnetic shield to prevent excessive loss of heat from the areas and to provide thermal lagging. The innermost oven 31 is controlled by temperature sensing devices, not shown, such as thermistors for a constant temperature slightly above the temperature of the outside oven 32. In a typical example the inner oven is set for 45° C. while the outer oven is set for 40° C. Fiberglass insulation material is used to fill the spaces between the envelope 5 and the innermost oven to provide thermal lagging such that rapid thermal fluctuations in the oven 31 are damped out as seen by the envelope 5.

A suitable cabinet 37 surrounds the lower portion of the tube and supports the tube via the intermediary of a heavy flange 38 as of aluminum fixedly secured to a reduced neck portion 5' of the vacuum envelope 5.

The magnetically shielded polarizing magnetic field solenoid 25 has been explained in detail as used for an atomic hydrogen maser. However, its usefulness is not limited to hydrogen masers but is useful for atomic beam tubes in general. For example, it is directly applicable to other atomic resonant beam tubes such as cesium beam tubes or thallium beam tubes of the type described in U.S. Patent application 233,573 filed Oct. 29, 1962 titled, "Atomic Beam Apparatus," inventor Joseph H. Holloway et al., now Patent No. 3,323,008, and assigned to the same assignee as the present invention. In the case of the latter type of atomic beam tubes the shielded solenoid 25 is used for providing a uniform axially directed polarizing magnetic C field region as shown in FIG. 4.

In the apparatus of FIG. 4 a beam source 41 such as a cesium oven projects a beam of atoms over an elongated beam path 42 axially directed of an evacuated envelope 43. A suitable state selecting magnet 44 such as a hexapole magnet rejects beam particles which are not of the proper quantum energy state. A split field H plane cavity resonator 45 is apertured at 46 for passage of the beam therethrough for electromagnetic interaction with the beam at a pair of axially spaced regions 47.

The cavity 45 is tuned for resonance at the atomic resonant frequency and excited at the frequency by microwave energy supplied from a microwave generator 48 via a coaxial line 49 and magnetic coupling loop 51, turned 90° for clarity. The A.C. cavity fields $H_1$ excite resonance of the atoms and resonance is detected by the combined action of a second state selecting magnet 52 which differentially deflects the resonated and unresonated beam particles and a beam detector 53 such as a hot wire ionizer and electron multiplier which produces a resonance signal output. The output signal is fed to an oscilloscope 54 and displayed as a function of a modulating frequency supplied from a modulator 55 which frequency modulates the microwave generator 48. A conventional servo control mechanism, not shown, is conventionally used to automatically maintain the frequency of the microwave generator on resonance of the atomic beam particles and a sample of the microwave generator signal is used as a frequency standard, in the conventional manner.

The polarizing magnetic C field, over the atomic resonance region of the beam, is provided by a magnetically shielded solenoid 25 as previously described and preferably includes a pair of separately energizable end turn segments 25b and 25c for cancelling out inhomogeneities produced by end effects and the openings 56 in the shield 21 for passage of the beam therethrough.

The magnetic mirror effect of the end closing walls of the cylindrical shield and the effect of taking the turns of the solenoid up substantially to the closing wall of the shield is depicted in FIG. 5. More specifically the end closing walls being made of a highly magnetic permeable material causes the magnetic flux lines H of the solenoid 25 to intersect perpendicularly with the surface of the shield 21 and end cover. Also, the current of the solenoid is reflected in the magnetic mirror as indicated. When the turns of the solenoid extend up to the end wall as shown in dotted lines a reflected solenoid 25' is produced with the same sense of current flow as the actual solenoid thereby making the solenoid 25 appear to have substantially infinite continuous form. However, when the spacing S between the last turn and the wall is appreciable then the reflected infinite solenoid has a gap of 2S causing the magnetic field lines H to bow outwardly as indicated by the solid lines thereby producing end effect magnetic perturbations in the magnetic field produced by the solenoid 25.

It has been found that the magnitude of these end effect perturbations is a function of solenoid length $l$ and radius $r$ and that substantial enhancement over the prior art is obtained if the solenoid satisfies the relation.

$$S < l/20$$

where S is the spacing between the end turn and the reflecting end shield.

The atomic resonance tube apparatus, previously described, is not limited to cesium or hydrogen atoms alone. Certain other isotopes of other metals such as, for example, thallium and rubidium may be used. Any electron re-orientation transition or resonance in atoms or molecules for which the net atoms or molecules angular momentum, $f$, is an integer in quantum units of Planks constant, $h$, may be used. In general, it is contemplated any suitable molecular or atomic beam or assemblage having desired resonance characteristics may be used. The term "atom or atomic particle" as used herein is defined to mean molecules as well as atoms.

Since many changes could be made in the above construction and many apparently widely different embodiments could be made without departing from the scope thereof, it is intended that all matter contained in the above description or shown in the accompanying drawings shall be interpreted as illustrative and not in a limiting sense.

What is claimed is:

1. An atomic resonance apparatus including, means for producing an assemblage of atomic particles, means for subjecting said assemblage of aotmic particles to an alternating magnetic field for producing atomic resonance of said atomic particles, means for producing and subjecting said assemblage of atomic particles to a polarizing magnetic field for aligning said resonant atomic particles, means for shielding said assemblage of resonant atomic particles from extraneously produced magnetic fields, said shielding means including a magnetically permeable structure encompassing said assemblage of resonant atomic particles and having a pair of diametrically opposed magnetically permeable end wall portions, and said polarizing magnetic field producing means including an electrical coil wound inside of said shield means in-between said diametrically opposed magnetically permeable end wall portions, said coil having an axial extent subtending substantially the full length of the space between said opposed end wall portions whereby undesired end effect perturbations of the polarizing magnetic field within said shield means are minimized.

2. An atomic resonance tube apparatus including, means for producing an assemblage of atomic particles, means for subjecting said assemblage of atomic particles to an alternating magnetic field for producing resonance of said atomic particles, means for producing and subjecting said assemblage of atoms to a static magnetic field component for aligning said atomic resonant particles, means for shielding said assemblage of atoms from extraneously produced magnetic fields, said shielding means including a tubular member of magnetic permeable material having transversely directed end closing walls of magnetically permeable material, and said means for producing and subjecting said atomic particles to said static field component including an electrical solenoid wound inside of said tubular shield means, and said solenoid having an axial extent subtending substantially the full length of said tubular shield such as to have end portions disposed substantially against said transverse closing walls of said shield means whereby said solenoid approximates an infinitely long solenoid and produces an exceptionally uniform axial static magnetic field component over said assemblage of atoms.

3. The apparatus according to claim 2 wherein said solenoid is segmented to include separately energizable turns, the ampere turns of one segment being variable controlled relative to another segment to cancel out undesired inhomogeneities within said solenoid.

4. The apparatus according to claim 3 wherein said separately energizable segment comprises an end segment of said solenoid.

5. The apparatus according to claim 4 wherein said solenoid includes a central segment forming a preponderance of the length of the composite solenoid and a pair of shorter end segments at opposite ends of said solenoid.

6. An atomic resonance apparatus including, means for producing an assemblage of atomic particles, means for subjecting said assemblage of atomic particles to an alternating magnetic field for producing atomic resonance of said atomic particles, means for producing and subjecting said assemblage of atomic particles to a polarizing magnetic field for aligning said resonant atomic particles, means for shielding said assemblage of resonant atomic particles from extraneously produced magnetic fields, said shielding means including a magnetically permeable structure encompassing said assemblage of resonant atomic particles and having a pair of diametrically opposed end wall portions, said polarizing magnetic field producing means including an electrical coil wound inside of said shield means inbetween said diametrically opposed wall portions, said coil being segmented to include separately energizable turns and the ampere turns of one segment being variably controlled relative to another segment to cancel out undesired inhomogeneities within said coil.

7. The apparatus according to claim 6 wherein said coil is a solenoid having a central segment forming a preponderance of the length of said solenoid and having a pair of shorter end segments at opposite ends of said solenoid and the ampere turns of said end segments being variably controlled relative to said central segment for cancelling out undesired inhomogeneities within said solenoid.

8. An atomic resonance tube apparatus including, means for producing an assemblage of atomic particles, means for subjecting said assemblage of atomic particles to an alternating magnetic field for producing resonance of said atomic particles, means for producing and subjecting said assemblage of atoms to a static magnetic field component for aligning said atomic resonant particles, means for shielding said assemblage of atoms from extraneously produced magnetic fields, said shielding means including a tubular member of magnetic permeable material having transversely directed end closing walls of magnetically permeable material, and said means for producing and subjecting said atomic particles to said static field component including an electrical solenoid wound inside of said tubular shield means, and said solenoid having an axial extent which satisfied the relationship $S < l/20$ where S is the spacing between the end turns of the solenoid and the end closing walls of magnetic permeable material, and $l$ is the axial length of said solenoid, whereby said solenoid approximates an infinitely long solenoid and produces an exceptionally uniform axial static magnetic field component over the said assemblage of atoms.

References Cited

UNITED STATES PATENTS 3,159,797   12/1964   Whitehorn _____ 331—94 X

ROY LAKE, *Primary Examiner.*

S. H. GRIMM, *Assistant Examiner.*